United States Patent [19]

Wallace

[11] 4,207,764
[45] Jun. 17, 1980

[54] PRECISION FIN INDEXING DEVICE FOR WIND TUNNEL MODELS

[75] Inventor: Richard S. Wallace, Anaheim, Calif.

[73] Assignee: The United States of America as represented by the Secretary of the Air Force, Washington, D.C.

[21] Appl. No.: 17,626

[22] Filed: Mar. 5, 1979

[51] Int. Cl.$^2$ .............................................. G01M 9/00
[52] U.S. Cl. ..................................................... 73/147
[58] Field of Search ................................... 73/147, 180

[56] References Cited

U.S. PATENT DOCUMENTS

| | | | |
|---|---|---|---|
| 2,711,648 | 6/1955 | Carlstrand | 73/147 |
| 3,453,878 | 7/1969 | Wilson | 73/147 |
| 3,460,383 | 8/1969 | Padera | 73/147 |

Primary Examiner—S. Clement Swisher
Attorney, Agent, or Firm—Joseph E. Rusz; Arsen Tashjian

[57] ABSTRACT

An indexing device includes an adapter conforming to the contours of the test model body with a cavity for housing a ring gear which has internal teeth segments in two diametrically opposed quadrants and is rigidly attached to the adapter. A movable fin with an aerodynamic surface includes a cylindrical hub welded to the base portion thereof. The hub is provided with a central shaft extension which engages a close fitting opening in the adapter and with two curved slots to accept clamping fasteners that thread into tapped holes in the adapter. A spur gear, modified to mesh with the modified ring gear on the adapter, is bolted on the under surface of the hub concentric with the shaft extension.

2 Claims, 1 Drawing Figure

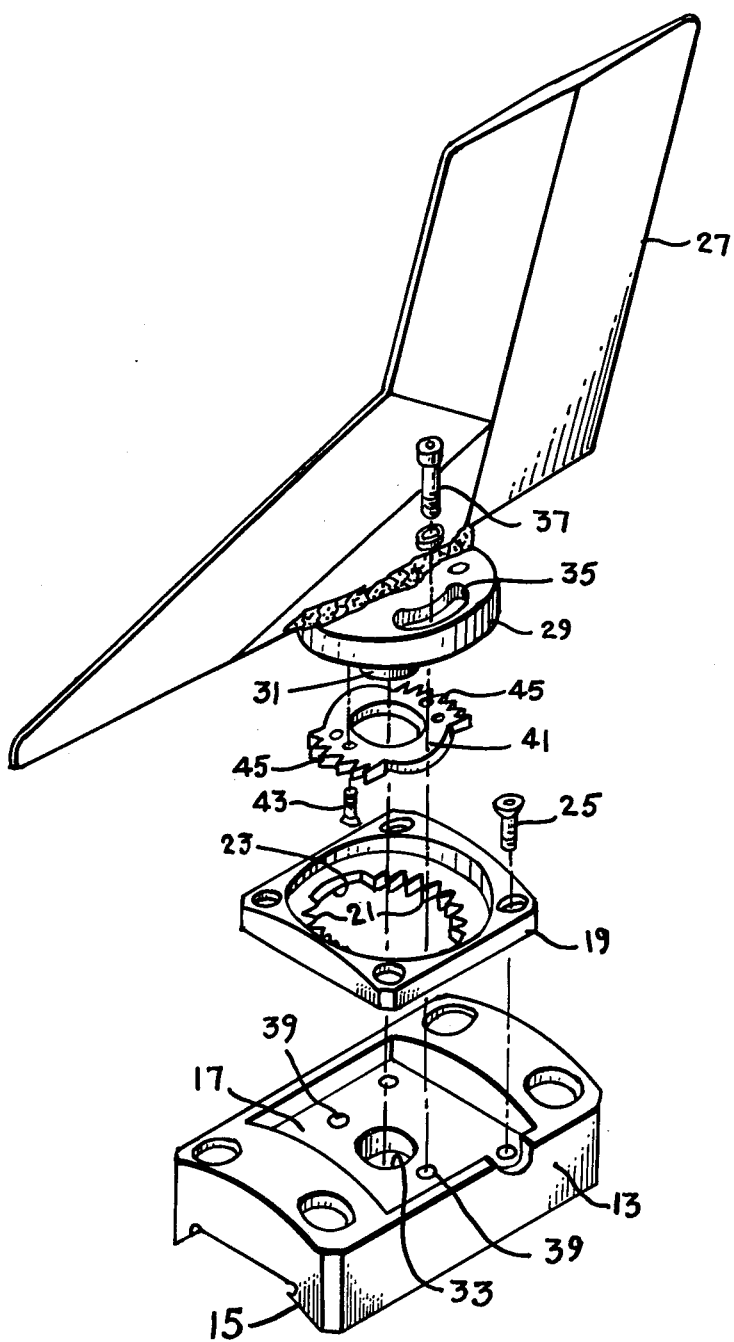

PRECISION FIN INDEXING DEVICE FOR WIND TUNNEL MODELS

STATEMENT OF GOVERNMENT INTEREST

The invention described herein may be manufactured and used by or for the Government for governmental purposes without the payment of any royalty thereon.

BACKGROUND OF THE INVENTION

This invention relates to a precision fin indexing device for wind tunnel models and, more particularly, the invention is concerned with providing an indexing device capable of rapid positive attachment to aerodynamic surfaces on wind tunnel models at various angular positions relative to the model centerline in repeatable fashion with quick incremental changes of angular position.

One of the ways to test airborne structures such as ballistic missiles is to make a model of the missile and then attach fins to the model and test it in a wind tunnel. The fins are attached to the model at various places and oriented at various angles to the flow direction of the air in the wind tunnel. In order to accurately compare the models of the airborne structures, it is necessary that the angle of the fins be repeatable to the exact degree. Also, it would be desirable if the fin angle and position could be changed quickly and easily in fixed repeatable increments.

Heretofore, the common practice for positioning the fins at a particular angle, has been with an indexing protractor. The fins are set as near as possible to the correct angle and then clamped in place by fasteners passing through curved slots in the fin base. The positioning was approximate at best, and difficult, if not impossible, to repeat because of movement during clamping. Also the procedure was time consuming and required the efforts of skilled techicians to obtain anywhere near accurate results. Thus, it can be seen that there is a definite need for an indexing device which is capable of achieving repeatability of fin positions while producing quick incremental changes of position. Also, the device should allow the rapid positive attachment of aerodynamic surfaces on wind tunnel models at various angular positions relative to the model centerline in repeatable fashion.

SUMMARY OF THE INVENTION

The invention is concerned with providing a precision fin indexing device for wind tunnel models wherein the rotational position of the fin can be varied in five degree increments in a fully repeatable manner with positive accuracy. The base of the device includes an adapter which conforms to the model body. A cavity in the adapter contains a modified ring gear rigidly attached to a balance block, housing a 6-component strain gage balance to measure aerodynamic forces on fins. A movable fin having aerodynamic surfaces is provided with a cylindrical hub welded to its base. A central shaft which extends downwardly from the hub, mates with a close fitting hole in the center of the adapter. A modified spur gear is bolted to the bottom of the hub for engagement with the modified ring gear on the adapter. Means are provided for clamping the fin in position after setting to the desired angle.

Accordingly, it is an object of the invention to provide a precision fin indexing device for wind tunnel model testing wherein the fin position of the indexing device is capable of complete repeatability with full accuracy of angle and position.

Another object of the invention is to provide a precision fin indexing device wherein quick and easy incremental changes can be made in the fin angle in five degree increments over a 40 degree range.

Still another object of the invention is to provide a precision fin indexing device wherein the aerodynamic fin surfaces are capable of being rapidly attached to the wind tunnel models at various angular positions relative to the model centerline in a repeatable manner.

A further object of the invention is to provide an indexing device which includes an adapter with a cavity in which is positioned a modified ring gear having internal gear teeth segments in two diametrically opposed quadrants.

A still further object of the invention is to provide an indexing device which includes a movable fin having a base to which is attached a modified spur gear that engages the modified ring gear on the adapter.

These and other objects, features and advantages will become more apparent after considering the following detailed description taken in conjunction with the annexed drawing and appended claims.

BRIEF DESCRIPTION OF THE DRAWING

The drawing FIGURE is an exploded view of the precision fin indexing device according to the invention showing the aerodynamic fin and spur gear assembly as it mates with the adapter and ring gear assembly.

DESCRIPTION OF A PREFERRED EMBODIMENT

Referring now to the drawing FIGURE, there is shown a fin indexing device including the base 13 which is an adapter having its lower surface 15 configured to conform to a balance block, housing a 6-component strain gage balance to measure aerodynamic forces on fin 27 which is a part of the model (not shown) being tested. A cavity 17 is formed in the upper surface of the adapter 13 for housing a ring gear 19 which has internal gear teeth segments 21 in two diametrically opposed quadrants. The other opposed quadrants 23 have been relieved for clearance purposes and the ring gear 19 is rigidly attached to the adapter 13 by four screws 25 (one of which is shown).

A movable aerodynamic fin 27 is provided with a cylindrical hub 29 welded to its lower surface. The hub 29 has a central shaft extension 31 that mates with a close fitting hole 33 in the center of the adapter 13. The hub 29 also has two curved slots 35 which serve as clamping fasteners and thread into tapped holes 39 in the adapter 13. A modified spur gear 41 is attached to the hub 29 by two machine screws 43, one of which is shown and is concentric with the shaft 31. The spur gear 41 has two quadrants of teeth removed to provide clearance for the clamping fastener 29. The remaining quadrants of teeth 45 are designed to mesh with the gear teeth 21 on the ring gear 19.

The aerodynamic fin 27 and modified spur gear 41 assembly mates with the adapter 13 and ring gear 19 assembly by aligning the hub shaft 31 with the mating hole 33 in the adaptor 12 and inserting the fin 27 downward until the teeth 45 on the spur gear 41 engage the teeth 21 on the ring gear 19. In a typical indexing device, the rotational position of the fin 27 can be varied in five degree increments when 72-tooth gears are chosen.

Each segment of teeth provide sufficient arc length to achieve this incremental spacing over a range of forty degrees.

Although the invention has been illustrated in the accompanying drawing and described in the foregoing specification in terms of a preferred embodiment thereof, the invention is not limited to this embodiment. It will be apparent to those skilled in the art that the hereinbefore described precision fin indexing device can be used in other operations where it is necessary and/or desirable to provide rapid positive attachment of aerodynamic surfaces to objects at various angular positions in repeatable fashion. Also, it should be noted that certain changes, modifications and substitutions can be made in the construction details of the invention without departing from the true spirit and scope of the appended claims.

Having thus set forth the nature of my invention, what I claim and desire to secure by Letters Patent of the United States is:

1. A precision fin indexing device for wind tunnel models and the like having a contoured surface thereon, said indexing device comprising an adapter positioned in a cavity on the surface of the model, said adapter having its lower surface conforming to the contour of a balance block, housing a 6-component strain gage balance to measure aerodynamic forces on fins, a cavity formed in the upper surface of said adapter, a modified ring gear positioned in the cavity in said adapter and rigidly attached thereto, said ring gear having internal gear teeth in two diametrically opposed quadrants, the other opposed quadrants in said ring gear being relieved for clearance, an aerodynamic fin positioned on said adapter for rotational movement relative thereto, a cylindirical hub fixidly attached to the lower surface of said aerodynamic fin, a shaft extension downwardly extending from said hub for engagement with a close fitting hole in said adapter, a modified spur gear attached to said hub and concentric with said shaft extension, said spur gear having two diametrically opposed quadrants of external teeth for engagement with said ring gear, the other opposed quadrants of teeth on said spur gear being removed for clearance, and means for clamping said aerodynamic fin at fixed increments of repeatable angular positions relative to the model centerline.

2. The precision fin indexing device defined in claim 1 wherein said means for clamping said aerodynamic fin at fixed increments of repeatable angular positions includes two curved slots in said hub end and two locking machine screws threaded into said adapter, the clearance in said ring and spur gears permitting said locking screws to engage the threads in said adapter without interference.

* * * * *